United States Patent
Lin

(10) Patent No.: US 10,409,108 B2
(45) Date of Patent: Sep. 10, 2019

(54) BACKLIGHT MODULE AND DISPLAY DEVICE

(71) Applicant: WUHAN TIANMA MICRO-ELECTRONICS CO., LTD., Wuhan (CN)

(72) Inventor: Wei Lin, Xiamen (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 16/130,388

(22) Filed: Sep. 13, 2018

(65) Prior Publication Data
US 2019/0121199 A1 Apr. 25, 2019

(30) Foreign Application Priority Data
Oct. 23, 2017 (CN) .......................... 2017 1 0990823

(51) Int. Cl.
| G02F 1/133 | (2006.01) |
| G02F 1/1335 | (2006.01) |
| G02F 1/1333 | (2006.01) |
| F21V 8/00 | (2006.01) |

(52) U.S. Cl.
CPC ..... *G02F 1/133603* (2013.01); *G02B 6/0025* (2013.01); *G02F 1/133308* (2013.01); *G02F 1/133512* (2013.01)

(58) Field of Classification Search
CPC ......... G02F 1/133603; G02F 1/133308; G02F 1/133512; G02B 6/0025
See application file for complete search history.

(56) References Cited

U.S. PATENT DOCUMENTS

2010/0195022 A1 8/2010 Shikii et al.
2013/0278861 A1* 10/2013 Hsiao .................... F21V 29/006
349/61

FOREIGN PATENT DOCUMENTS

| CN | 101743510 A | 6/2010 |
| CN | 202631909 U | 12/2012 |

* cited by examiner

*Primary Examiner* — Anne M Hines
(74) *Attorney, Agent, or Firm* — Alston & Bird LLP

(57) ABSTRACT

A backlight module is disclosed, which includes a light source; a light guide plate disposed on the light source. The light guide plate has a bottom surface receiving light from the light source and a front surface emitting light, and the front surface is perpendicular to the bottom surface. The light guide plate has a first notch placed on a top corner; and a plastic frame circumventing the light source and the light guide plate. The plastic frame comprises a portion starting from a frame light incident section near the light source and ending at a first frame light emitting section near the first notch, and the portion is light transparent to pass light from the light source, and has a reflective coating.

20 Claims, 13 Drawing Sheets

BACKLIGHT MODULE AND DISPLAY DEVICE

CROSS REFERENCE TO RELATED APPLICATION

The present application claims priority to Chinese Patent Application No. CN201710990823.7, titled "BACKLIGHT MODULE AND DISPLAY DEVICE HAVING THE SAME", filed on Oct. 23, 2017 with the state intellectual property office of People's Republic of China, which is incorporated herein by reference in its entirety.

FIELD

The present disclosure relates to the technical field of display, and in particular to a backlight module and a display device including the backlight module.

BACKGROUND

In liquid crystal display devices, for example, in some mobile phones, it is required to provide a backlight module as a light source for a display screen. The backlight module generally includes an LED lamp strip to generate a backlight, and includes a light guide plate and optical sheets to uniform backlight brightness.

For an irregular backlight module having a notch at a corner, the light received by edges of the notch region from a light source is uneven, which results in the uneven brightness at the display edges. In the conventional technology, in order to ensure the even brightness of the notch region, an auxiliary light source is generally provided at the notch, and the brightness of the main light source and the auxiliary light source are controlled by a main board, so as to display contents in the corresponding regions. In this case, considering the placement and the wiring of the auxiliary light source at the notch, it is required to provide a light shielding region in addition to shield the auxiliary light source and related control circuit at the notch, which results in a smaller display region at the notch, a larger size of the notch, and a quite wider frame. Further, it is required to separately provide a control circuit for the auxiliary light source, which results in a complicated main board circuit of the display device and thus an increased cost.

SUMMARY

A backlight module and a display device including the backlight module are provided in the present disclosure. In the backlight module, additional light passes through the a transparent portion of the plastic frame via a frame light incident section close to the light source and a frame light emitting section close to a notch of a light guide plate to compensate weaker light around the notch area. With this light compensation method, an auxiliary light source and a control circuit separately provided for the auxiliary light source used in conventional design for the notch of the light guide plate are no longer needed. So a narrower frame can be realized.

A backlight module provided in certain embodiments of the present disclosure includes a light guide plate, a light source and a plastic frame. A surface of the light guide plate close to the light source is a bottom surface of the light guide plate, a surface of the light guide plate opposite to the bottom surface is a top surface of the light guide plate, a light emitting surface of the light guide plate is a front surface of the light guide plate, and a surface of the light guide plate opposite to the front surface is a back surface of the light guide plate. Surfaces of the light guide plate connected to the front surface, the back surface and the bottom surface are a first side surface and a second side surface. At least one notch is formed on the first side surface, the second side surface or the top surface, and the notch penetrates from the front surface to the back surface. The plastic frame surrounds and covers the light source, the first side surface, the second side surface and the top surface to form an accommodating space for exactly accommodating the light guide plate and the light source. A side of the plastic frame covering the light guide plate and the light source is an inner wall of the plastic frame. A plastic frame light incident section and a plastic frame light emitting section are provided on the inner wall of the plastic frame. The plastic frame light incident section is located at a position of the plastic frame coving the light source, and the plastic frame light emitting section is located at a position of the plastic frame covering the notch of the light guide plate. A surface of the plastic frame light emitting section is nonparallel to the bottom surface. The plastic frame includes a first portion and a second portion. A part of the plastic frame from the plastic frame light incident section to the plastic frame light emitting section in one direction is the first portion of the plastic frame, via which light emitted by the light source is conducted from the plastic frame light incident section to the plastic frame light emitting section. The first portion of the plastic frame is made of a light transmissive material, and a reflection layer is provided on an outer surface of the first portion of the plastic frame. The plastic frame light incident section and the plastic frame light emitting section can transmit light. A display device is further provided includes the backlight module described above. The display device further includes a display panel located above the backlight module.

BRIEF DESCRIPTION OF THE DRAWINGS

In order to more clearly illustrate technical solutions in embodiments of the present disclosure, the drawings used in the description of the embodiments are briefly described below. It is apparent that the drawings in the following description show only some embodiments of the present disclosure, and other drawings may be obtained by those skilled in the art based on the drawings without any creative efforts.

FIG. 4c is a cross sectional view of a plastic frame conduction portion taken along a line c1-c2 in FIG. 3a;

FIG. 4d is a cross sectional view of a plastic frame light incident section taken along a line a1-a2 in FIG. 3a;

FIG. 4e is a cross sectional view of a plastic frame light emitting section taken along a line b1-b2 in FIG. 3a;

FIG. 4f is a cross sectional view of a second portion of a plastic frame in another backlight module according to an embodiment of the present disclosure taken along a line d1-d2 in FIG. 3a;

FIG. 4g is a cross sectional view of a second portion of a plastic frame in another backlight module according to an embodiment of the present disclosure taken along a line d1-d2 in FIG. 3a;

FIG. 5b is an enlarged view of a region where a light shielding portion is located in FIG. 5a;

FIG. 5c is a cross sectional view of the light shielding portion taken along a line d1-d2 in FIG. 5a;

DETAILED DESCRIPTION OF EMBODIMENTS

The technical solutions in the embodiments of the present disclosure are clearly and completely described below with reference to the drawings in the embodiments of the present disclosure. It is apparent that the described embodiments are only some embodiments of the present disclosure, rather than all embodiments. All other embodiments obtained by those skilled in the art based on the embodiments of the present disclosure without creative efforts fall in the protection scope of the present disclosure.

A backlight module is provided according to an embodiment of the present disclosure. The backlight module includes a light guide plate, a light source and a plastic frame.

A surface of the light guide plate close to the light source is a bottom surface of the light guide plate, a surface of the light guide plate opposite to the bottom surface is a top surface of the light guide plate, a light emitting surface of the light guide plate is a front surface of the light guide plate, and a surface of the light guide plate opposite to the front surface is a back surface of the light guide plate. Surfaces of the light guide plate connected to the front surface, the back surface and the bottom surface are a first side surface and a second side surface. At least one notch is formed on the first side surface, the second side surface or the top surface, and the notch penetrates from the front surface to the back surface.

The plastic frame surrounds and covers the light source, the first side surface, the second side surface and the top surface to form an accommodating space for exactly accommodating the light guide plate and the light source. A side of the plastic frame covering the light guide plate and the light source is an inner wall of the plastic frame. A plastic frame light incident section and a plastic frame light emitting section are provided on the inner wall of the plastic frame. The plastic frame light incident section is located at a position of the plastic frame coving the light source, and the plastic frame light emitting section is located at a position of the plastic frame covering the notch of the light guide plate. A surface of the plastic frame light emitting section is nonparallel to the bottom surface.

The plastic frame includes a first portion and a second portion. A part of the plastic frame from the plastic frame light incident section to the plastic frame light emitting section in one direction is the first portion of the plastic frame, via which light emitted by the light source is conducted from the plastic frame light incident section to the plastic frame light emitting section.

The first portion of the plastic frame is made of a light transparent material, and a reflection layer is provided on an outer surface of the first portion of the plastic frame. The plastic frame light incident section and the plastic frame light emitting section can transmit light.

Figure 1:
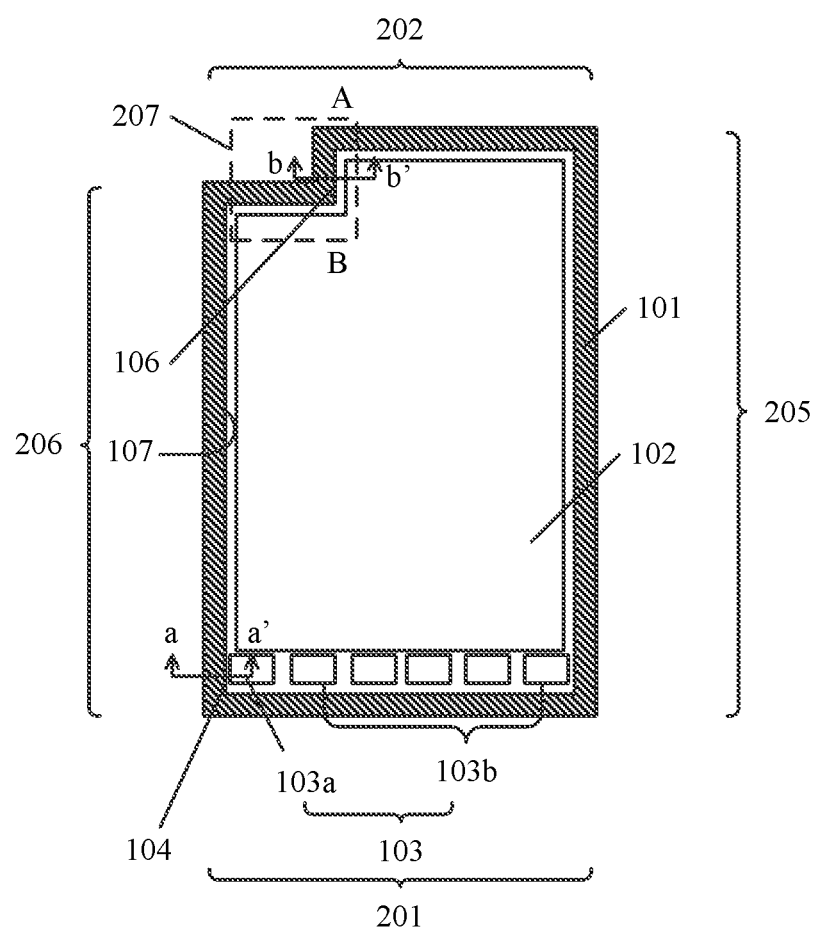
FIG. 1 is a schematic plan view of a backlight module according to an embodiment of the present disclosure.

Reference is made to FIG. 1, which is a schematic plan view of a backlight module provided in the present disclosure. The backlight module includes a plastic frame 101, a light guide plate 102, and a light source 103.

Figure 2A:
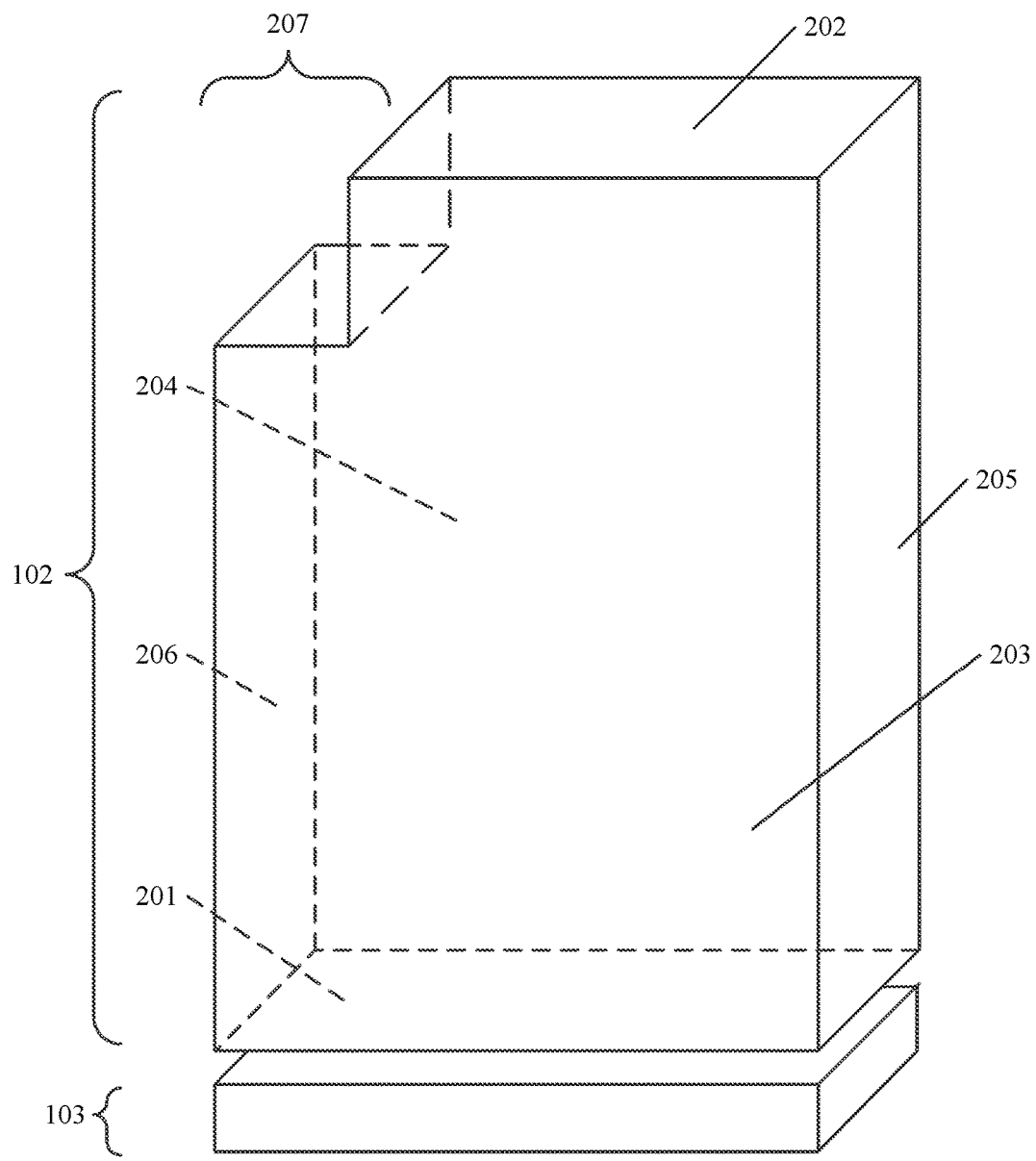
FIG. 2a is a schematic diagram showing a perspective view of a light guide plate and a light source in the backlight module according to an embodiment of the present disclosure.

Reference is made to FIG. 2a, which is a three-dimensional view of a light guide plate and a light source in the backlight module provided in the present disclosure. The light source 103 is located below a bottom surface 201 of the light guide plate 102. A surface of the light guide plate opposite to the bottom surface 201 is a top surface 202, a light emitting surface 203 of the light guide plate is a front surface of the light guide plate, and a surface of the light guide plate opposite to the front surface 203 is a back surface 204 of the light guide plate. A first side surface 206 and a second side surface 205 of the light guide plate are connected to the top surface 202, the bottom surface 201, the front surface 203 and the back surface 204 of the light guide plate. A notch 207 is formed on the top surface 202 and penetrates from the front surface 203 to the back surface 204 of the light guide plate. Optionally, the notch may also be formed on the first side surface 206 or the second side surface 205. The position and the number of the notch 207 are determined according to the shape of the required irregular backlight module.

Figure 2B:
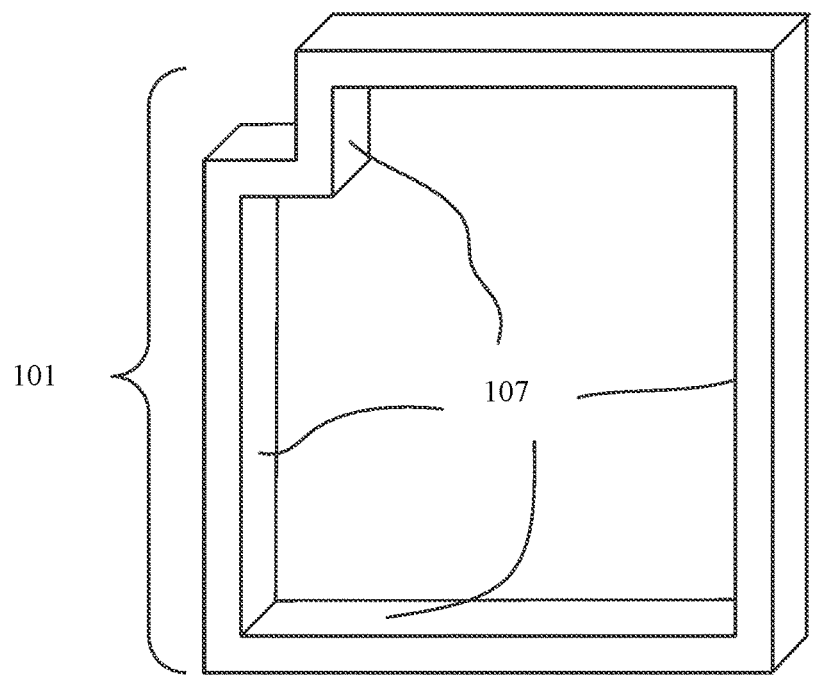
FIG. 2b is a schematic diagram showing a perspective view of a plastic frame in the backlight module according to an embodiment of the present disclosure.
Figure 2C:
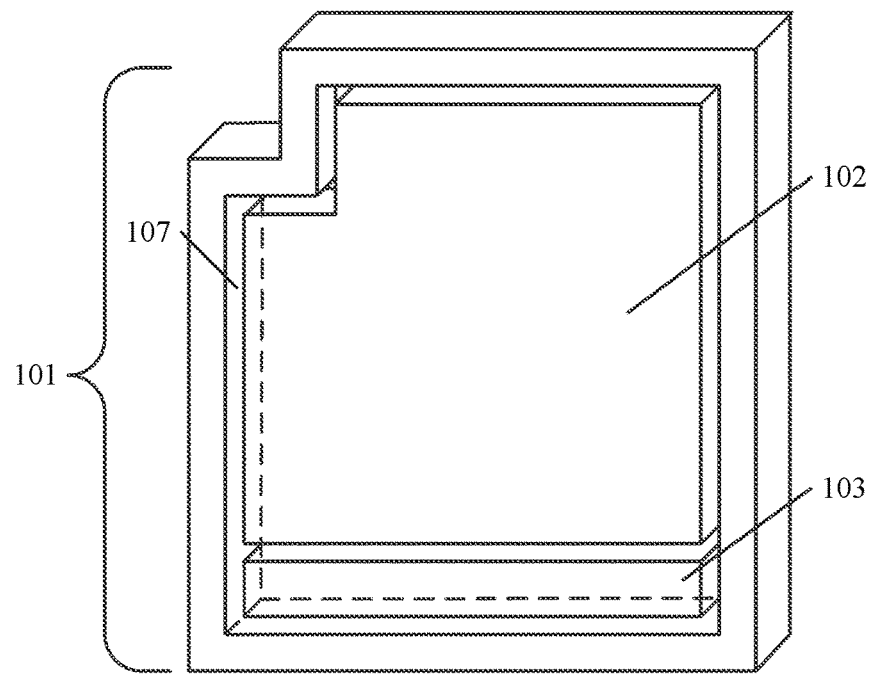
FIG. 2c is a schematic diagram showing an integrated perspective view of the backlight module according to an embodiment of the present disclosure.

Referring again to FIG. 1, a plastic frame 101 surrounds the light source 103 and the light guide plate 102. A perspective view of the plastic frame 101 is shown in FIG. 2b. The plastic frame includes a plastic frame inner wall 107. Reference is made to FIG. 2c, which is a schematic diagram showing a perspective view of the backlight module provided in the present disclosure. An outline of the plastic frame inner wall 107 is consistent with an outline of the light guide plate 102 with the notch. The plastic frame covers the first side surface 206, the second side surface 205, and the top surface 202 of the light guide plate 102, as well as the light source 103 in FIG. 2a, to accommodate the light guide plate 102 and the light source 103.

Figure 4A:
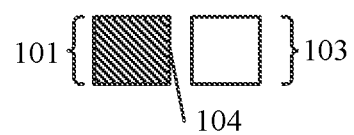
FIG. 4a is a cross sectional view of a plastic frame light incident section taken along a line a-a' in FIG. 1.

Further, as shown in FIG. 1, a part of the plastic frame inner wall 107 close to the light source 103 is a plastic frame light incident section 104. A cross sectional view of the plastic frame light incident section is show in FIG. 4a, which is taken along a line a-a' in FIG. 1. It can easily be seen from FIG. 4a that, the plastic frame light incident section 104 is located on the plastic frame 101 and is close to the light source 103, so as to directly receive light emitted by the light source 103. The plastic frame light incident section 104 is not limited to the section located on the plastic frame inner wall in a direction of the first side surface 206 as shown in FIG. 1, but may also be located on the plastic frame inner wall close to any one light emitting unit in the light source 103 in other directions (for example, in a direction of the second side surface 205 or in a direction of the light source 103). In this case, the cross sectional view of the light source 103 close to the plastic frame light incident section 104 and the plastic frame light incident section 104 is consistent with FIG. 4*a*.

Figure 4B:
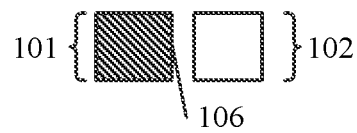
FIG. 4b is a cross sectional view of a plastic frame light emitting section taken along a line b-b' in FIG. 1.

Further, as shown in FIG. 1, a plastic frame light emitting section 106 is provided on the plastic frame inner wall 107 in the region of the notch 207. The notch 207 has multiple surfaces. A part of the top surface 202 having no notch is parallel to a light incident section of the light guide plate 102, i.e., the bottom surface 201 of the light guide plate in FIG. 2*a*. In this case, the amount of light received by a surface in the region of the notch 207 not parallel to the bottom surface 201 of the light guide plate is not the same as the amount of light received by a surface parallel to the bottom surface 201 of the light guide plate, which results in uneven display of the notch region. Therefore, the surface in the region of the notch 207 not parallel to the bottom surface 201 of the light guide plate, such as the surface of segment AB in FIG. 1, needs light compensation. Therefore, the plastic frame inner wall 107 corresponding to the segment AB in the region of the notch 207 intersected with (not parallel to) the bottom surface 201 of the light guide plate in FIG. 1 is provided with the plastic frame light emitting section 106. A cross sectional view of the plastic frame light emitting section 106 is shown in FIG. 4*b*, which is taken along a line b-b' in FIG. 1. It can easily be seen from FIG. 4*b* that, the plastic frame light emitting section 106 is located on the plastic frame 101 and is close to the light guide plate 102 in the region of the notch, so as to transmit light to the region of the light guide plate 102 that needs the light compensation.

Figure 3A:
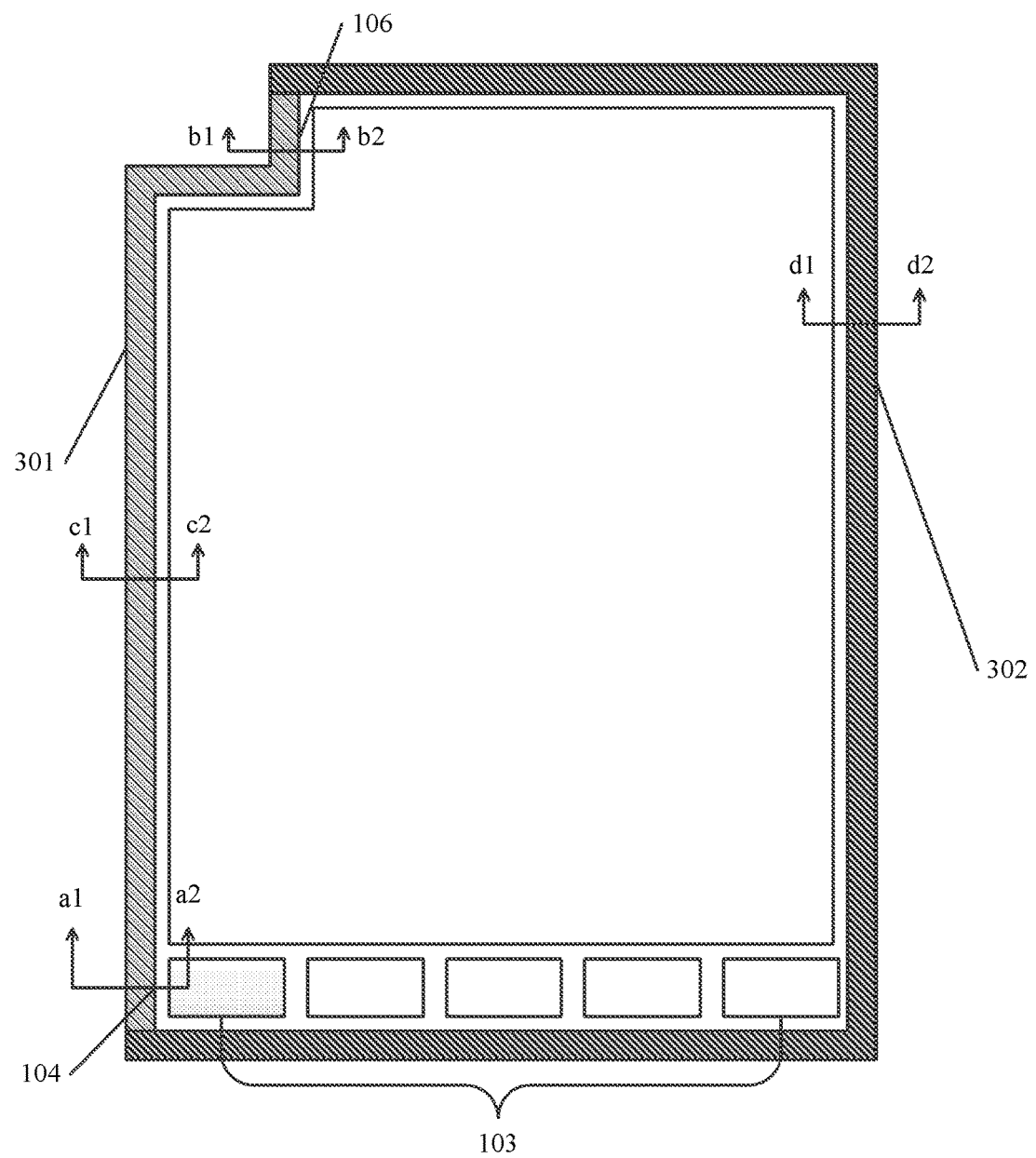
FIG. 3a is a schematic structural diagram of the plastic frame in the backlight module according to an embodiment of the present disclosure.

FIG. 3*a* is a schematic structural diagram of the plastic frame in the backlight module provided in the present disclosure. In this implementation, the plastic frame is divided into two parts, i.e., a first portion 301 and a second portion 302. A part of the plastic frame from the plastic frame light incident section 104 to the plastic frame light emitting section 106 in a leftward direction is the first portion 301 of the plastic frame, via which light emitted by the light source 103 is conducted to the plastic frame light emitting section 106. The first portion of the plastic frame serves as a light conduction portion. The other part of the plastic frame is the second portion 302 of the plastic frame. Optionally, in the schematic structural diagram shown in FIG. 3*a*, the second portion 302 of the plastic frame from the plastic frame light incident section 104 to the plastic frame light emitting section 106 in a rightward direction may be used to conduct light. In this case, the second portion 302 of the plastic frame also includes the plastic frame light incident section 104 and the plastic frame light emitting section 106 to conduct light. Alternatively, the entire plastic frame may be used to conduct light.

Figure 4C:
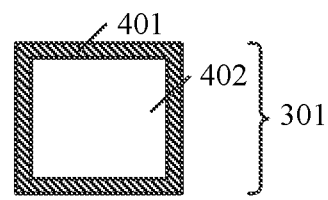
Figure 4D:
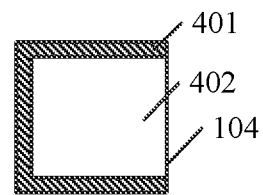

Reference is made to FIG. 4*c*, which is a cross sectional view of the plastic frame light conduction portion taken along a line c1-c2 in FIG. 3*a*. In order to ensure transmission of light in the plastic frame, in this implementation, the first portion 301 of the plastic frame is made of a light transparent material 402. The light transparent material 402 may be polycarbonate (PC), polymethyl methacrylate (PMMA) or other materials having high light transmittance. Further, a reflection layer 401 is provided on a surface of the light transparent material. The reflection layer may be formed by a vapor deposition process, a coating process or the like. The reflection layer is made of a material having high light reflectivity, such as a reflective metal of tinfoil, or other white or pale materials having high reflectivity. In this way, during a process that light is conducted in the first portion 301 of the plastic frame, when the light reaches the surface of the plastic frame, the light is substantially reflected by the reflection layer 401 back to the first portion 301 of the plastic frame, and continues to be conducted in the plastic frame. A cross sectional view of the plastic frame light incident section 104 taken along a line a1-a2 in FIG. 3*a* is shown in FIG. 4*d*. The plastic frame at the light incident section 104 is also made of the light transparent material 402. A reflection layer 401 is also provided on an outer surface of the plastic frame at the light incident section 104, but the plastic frame light incident section 104 can transmit light. It can be seen from FIG. 4*a* that, the plastic frame light incident section 104 is close to the light source 10. Since the plastic frame light incident section 104 is required to receive the light emitted by the light source 103, the plastic frame light incident section 104 in FIG. 4*d* is not provided with the reflection layer 401. The plastic frame light incident section 104 may be formed by exposing the light transparent material 402, or by providing some other materials that can transmit light (for example, transparent plastic, resin or organic glass). Further, the light incident section may also be formed as a structure that concentrates light beams, such as a lens.

Figure 4E:
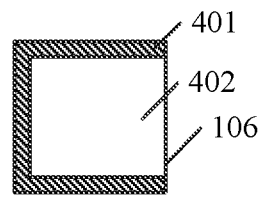

A cross sectional view of the plastic frame light emitting section 106 taken along a line b1-b2 in FIG. 3*a* is shown in FIG. 4*e*. The plastic frame at the light emitting section 106 is also made of the light transparent material 402. A reflection layer 401 is also provided on an outer surface of the plastic frame at the light emitting section 106, but the plastic frame light emitting section 106 can transmit light. It can be seen from FIG. 4*b* that the plastic frame light emitting section 106 is close to the light guide plate 102 at the notch. Since the plastic frame light emitting section 106 is required to emit the conducted light onto the light guide plate 102 to compensate for the brightness in the notch region of the light guide plate 102, the plastic frame light emitting section 106 in FIG. 4*e* is not provided with the reflection layer 401. The light emitting section may be formed by exposing the light transparent material 402, or by providing some other materials that can transmit light (for example, transparent plastic, resin or organic glass). Further, the light emitting section may also be form as a structure that changes the emitted light to parallel light, such as a lens.

Figure 3B:
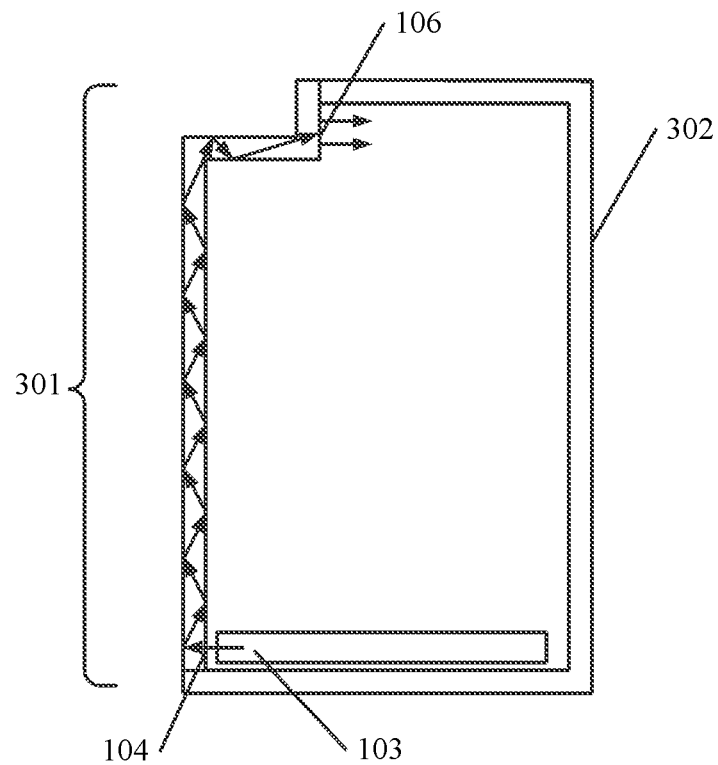
FIG. 3b is a schematic diagram showing an optical path in the plastic frame in the backlight module according to an embodiment of the present disclosure.

In the above plastic frame structure, an optical path in the plastic frame in the backlight module according to the present embodiment is shown in FIG. 3*b*. Since the plastic frame can transmit light, light emitted by the light source 103 enters into the first portion 301 of the plastic frame through the plastic frame light incident section 104. Since the outer surface of the first portion 301 of the plastic frame is coated with the reflection layer, the light is not transmitted outside the plastic frame, but is continuously reflected to the plastic frame light emitting section 106. Further, since the plastic frame light emitting section can transmit light, the light is emitted from the plastic frame light emitting section 106 to compensate for the brightness in the notch region.

In the backlight module according to the present embodiment, instead of using an auxiliary light source for compensating for the brightness at the notch of the irregular backlight module, the backlight source is reused and the plastic frame serves as the conduction portion, which saves the cost and space, increases a display region in the notch of the backlight module, narrows the frame at the notch of the backlight module, and simplifies the structure.

Figure 4F:
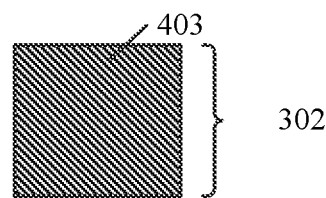

Further, in another embodiment, the first portion 301 of the plastic frame as shown in FIG. 3a serves as the light conduction portion, which, as shown in FIG. 4c, is made of the light transparent material 402 and is provided with the reflection layer 401 on the outer surface. Reference is made to FIG. 4f, which is a cross sectional view of the second portion of the plastic frame in the backlight module provided in this embodiment taken along a line d1-d2 in FIG. 3a. The second portion 302 of the plastic frame is made of a light non-transparent material 403. The light non-transparent material may be a material that is commonly used in the plastic frame in the conventional technology to block light propagation, such as white or gray resin, rubber or plastic. The plastic frame light incident section 104 and the plastic frame light emitting section 106 in FIG. 3a in this embodiment can transmit light, as in the above embodiments.

In this embodiment, the second portion of the plastic frame does not conduct light emitted by the light source, and is made of a light non-transparent material. In this way, the light emitted by the light source is conducted only in one direction, which reduces loss of light transmission efficiency due to a long optical path. Further, since the commonly used light non-transparent material for the plastic frame is cheaper than a good light transparent material, the reduced use of the light transparent material in this embodiment leads to a reduced cost.

Figure 4G:
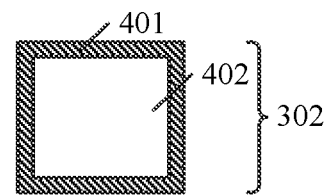

Further, in another embodiment, both the first portion 301 and the second portion 302 of the plastic frame in FIG. 3a serve as the light conduction portion. The sectional structure of the first portion 301 of the plastic frame is the same as that shown in FIG. 4c. The first portion 301 of the plastic frame is made of the light transparent material 402, and is provided with the reflection layer 401 on the outer surface. Reference is made to FIG. 4g, which is a cross sectional view of the second portion of the plastic frame in the backlight module provided in this embodiment taken along a line d1-d2 in FIG. 3a. In this embodiment, the second portion 302 of the plastic frame is also made of the light transparent material 402, and is provided with the reflection layer 401 on the outer surface. Both the plastic frame light incident section 104 and the plastic frame light emitting section 106 in FIG. 3a can transmit light.

In this embodiment, both the first portion and the second portion of the plastic frame are made of the light transparent material, and provided with the reflection layer on the outer surfaces. In this case, the plastic frame may be integrally formed, rather than being formed by assembling two parts made of different materials, which simplifies the manufacturing process.

Further, the light transparent material 402 may be a transparent material, which may be, for example, the same material as that of the light guide plate, so as to improve the light transmission efficiency.

In addition, in an embodiment, an improvement is made on the light source 103 of the backlight module in the first embodiment. As shown in FIG. 1, in this embodiment, the light source 103 is divided into a first light source 103a close to the plastic frame light incident section 104, and a second light source 103b. Furthermore, an LED lamp strip having multiple LED lamps may be used as the light source 103. Referring again to the structural diagram in FIG. 1, the first light source 103a is at least the LED lamp closest to the plastic frame light incident section 104. In this embodiment, the first light source 103a in the backlight module is reused as a light source compensating for the weaker brightness at the notch. The light emitted by the first light source 103a enters into the plastic frame 101 through the plastic frame light incident section 104 and is conducted to the plastic frame light emitting section 106 to compensate for the brightness at the surface of segment AB of the notch 207 of the light guide plate intersected with the bottom surface 201 of the light guide plate. Further, a control circuit may be provided for the first light source 103a separately from the second light source 103b. In this case, different from the case of providing an additional circuit as a control circuit of an auxiliary light source in the conventional technology, a change may be made to the circuit related to the first light source 103a in the control circuit for the entire backlight source 103, so that the control circuit for the first light source 103a may operate in response to an active adjustment signal from a user, an adaptive adjustment signal from the backlight module, or other related signals from an external environment (for example, natural light intensity or temperature), to control the switching and brightness adjustment of the first light source 103a, thereby adapting to different requirements for brightness compensation under notches of different irregular backlight modules, different users, and different external environments.

Figure 5A:
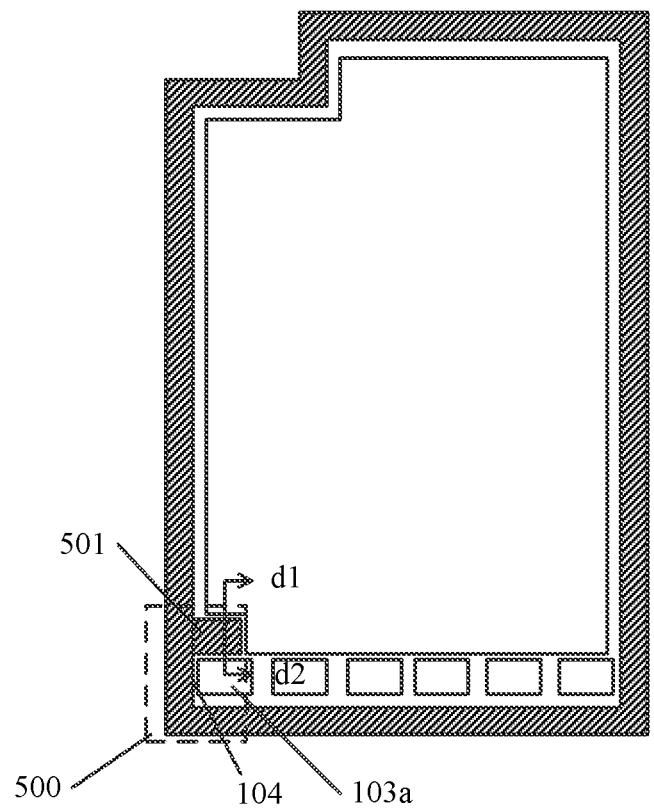
FIG. 5a is a schematic structural diagram of another backlight module according to an embodiment of the present disclosure.

Another embodiment of the present disclosure is shown in FIG. 5a, which is a schematic structural diagram of another backlight module provided in the present disclosure. Based on the above embodiments, a plastic frame light incident section 104 is provided on a plastic frame inner wall in a direction of the first side surface or the second side surface of the light guide plate, and a light shielding portion 501 is provided above the plastic frame light incident section 104 and the light source 103a.

Figure 5B:
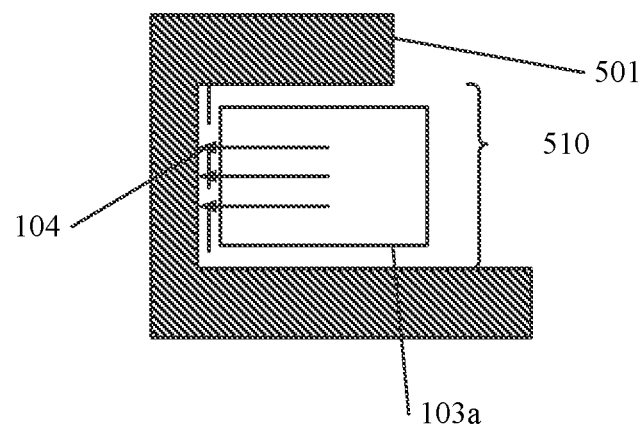

FIG. 5b is an enlarged view of a region of the light shielding portion in FIG. 5a. It can be seen that, the plastic frame light incident section 104, the light shielding portion 501, and the remaining plastic frame form an accommodating recess 510 for accommodating the first light source 103a. The accommodating recess is a semi-enclosed structure having one opened side. The light shielding portion 501 serves as an upper wall of the accommodating recess, the plastic frame light incident section 104 serves as a side wall of the accommodating recess, and the plastic frame inner wall close to the bottom surface of the light source serves as a bottom wall of the accommodating recess. Further, the shape and size of the recess may match with the light source 103a. In addition, a planar projection of the light shielding portion 501 is not limited to the rectangular structure as shown in FIG. 5a. The light shielding portion 501 may be formed in other structures, such as an arc-shaped structure or an L-shaped structure, as long as the light shielding portion can prevent the light emitted by the first light source 103a from directly affecting the light guide plate.

Figure 5C:
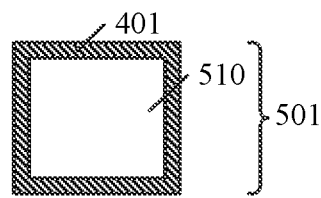

FIG. 5c is a cross sectional view of the light shielding portion taken along a line d1-d2 in FIG. 5a. Referring to FIG. 5c, similar to the light conduction portion of the plastic frame, an outer surface of the light shielding portion 501 is provided with a reflection layer 401. The inside of the light shielding portion 501 may be made of a light transparent material, as the first portion of the plastic frame, but is not limited thereto.

With the light shielding portion provided in the above embodiment, the influence of the first light source 103a, which is reused to compensate for the brightness at the notch, on other regions of the light guide plate can be reduced. Further, since the reflection layer is provided on the outer surfaces of the light shielding portion 501 and other portions of the plastic frame, most of the light emitted by the light source 103*a* can eventually enter from the light incident section 104 which is not provided with the reflection layer, improving the efficiency of receiving the light emitted by the light source 103*a*.

Regarding a specific position and shape of the notch of the light guide plate, as shown in FIG. 2*a*, the notch is generally located in the region 207 where the top surface 202 of the light guide plate is intersected with the first side surface 206 of the light guide plate. Further, the notch is generally formed as a rectangular notch. The technical solution of the present disclosure is not only applicable to this type of irregular backlight module, but also applicable to another irregular backlight module with multiple notches in the light guide plate.

Figure 6:
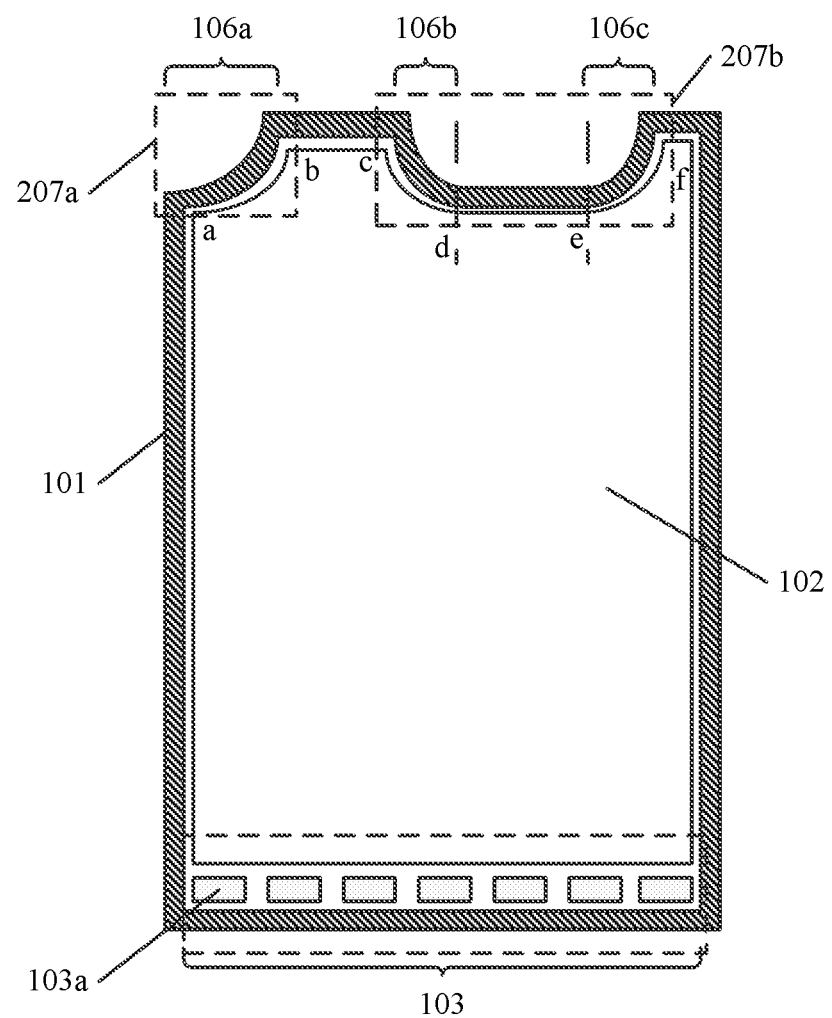
FIG. 6 is a schematic plan view of a backlight module according to another embodiment of the present disclosure.

FIG. 6 is a schematic plan view of another backlight module provided in the present disclosure. Two notches 207*a* and 207*b* are provided in the light guide plate 102. A segment ab of the plastic frame inner wall at the first notch 207*a*, as well as segments cd and ef of the plastic frame inner wall at the second notch 207*b* is nonparallel to the bottom surface of the light guide plate 102. In this case, a first light emitting section 106*a* is provided on the segment ab of the plastic frame inner wall, a second light emitting section 106*b* is provided on the segment cd of the plastic frame inner wall, and a third light emitting section 106*c* is provided on the segment ef of the plastic frame inner wall. The light emitted by the light source 103 is conducted to the three light emitting sections through the plastic frame 101.

Figure 7A:
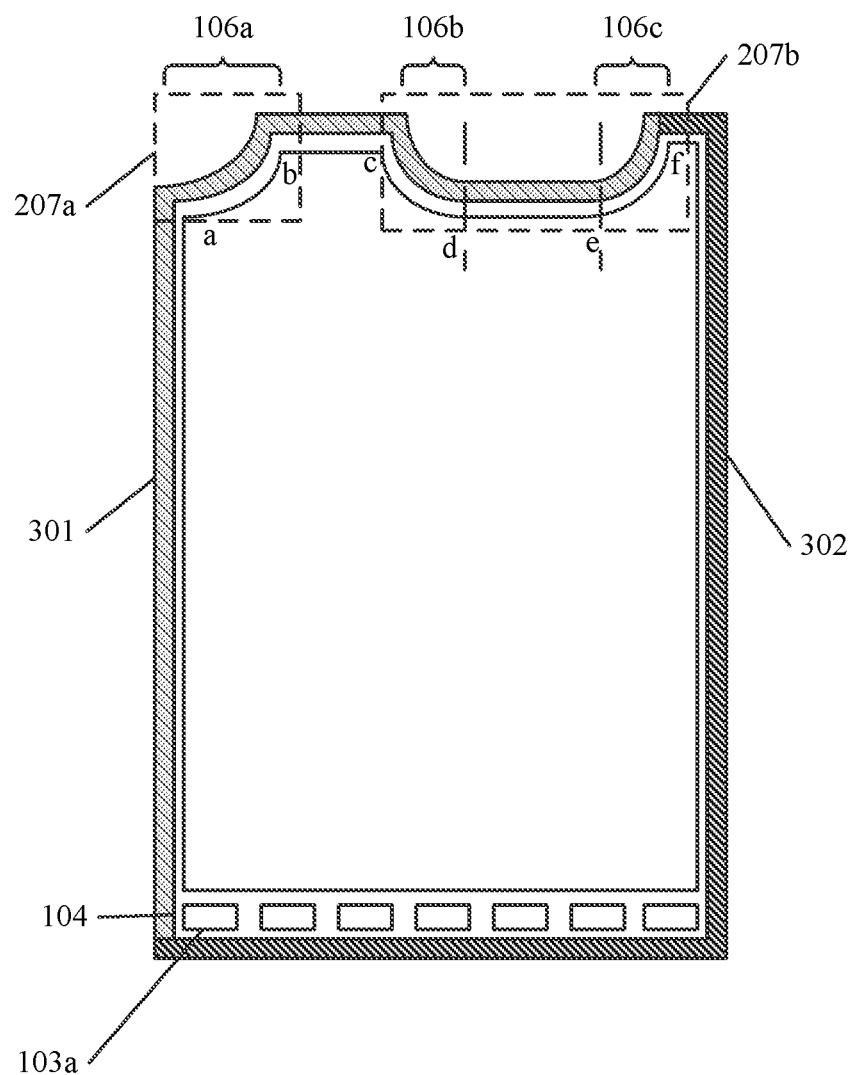
FIGS. 7a to 7c are schematic structural diagrams of a plastic frame in the backlight module in FIG. 6.

FIG. 7*a* is a schematic structural diagram of a plastic frame in the backlight module in FIG. 6. In the implementation shown in FIG. 7*a*, the plastic frame is also divided into a first portion 301 and a second portion 302. In the case that the first portion 301 serves as the light conduction portion, the first portion 301 extends from the plastic frame light incident section 104 close to the first light source 103*a* to the first plastic frame light emitting section 106*a*, then extends to the second plastic frame light emitting section 106*b* through the plastic frame corresponding to a segment bc, and then extends to the third plastic frame light emitting section 106*c* through the plastic frame corresponding to a segment de. The first portion of the plastic frame, as the light conduction portion, is made of a light transparent material, and is provided with a reflection layer on an outer surface. The plastic frame light incident section 104, the first plastic frame light emitting section 106*a*, the second plastic frame light emitting section 106*b*, and the third plastic frame light emitting section 106*c* can transmit light.

Figure 7B:
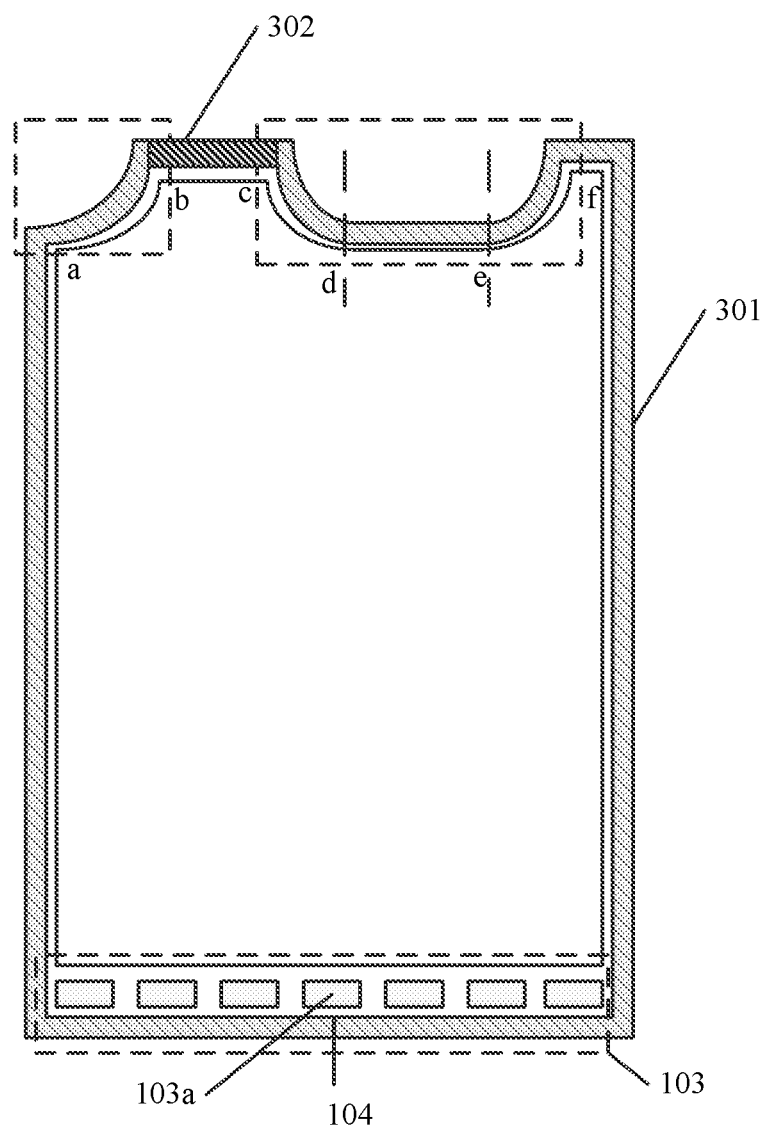

FIG. 7*b* is also a schematic structural diagram of the plastic frame in the backlight module in FIG. 6. The first portion and the second portion of the plastic frame may also be designed as shown in FIG. 7*b*. In FIG. 7*b*, the plastic frame corresponding to the segment bc is the second portion 302 of the plastic frame, and the remaining plastic frame is the first portion 301 of the plastic frame. The first portion 301 of the plastic frame is made of a light transparent material, and is provided with a reflection layer on the outer surface. In this case, the first light source that can be reused as a light source for the plastic frame light incident section 104 is not limited to two ends of the light source 103, but may be any part (for example, a sub light source 103*a*) of the light source 103. The plastic frame light incident section 104 is correspondingly arranged on the plastic frame inner wall covering the compensation light source. For example, in a case that the sub light source 103*a* is reused as the first light source, the plastic frame light incident section 104 is arranged on the plastic frame inner wall covering the sub light source 103*a*.

Figure 7C:
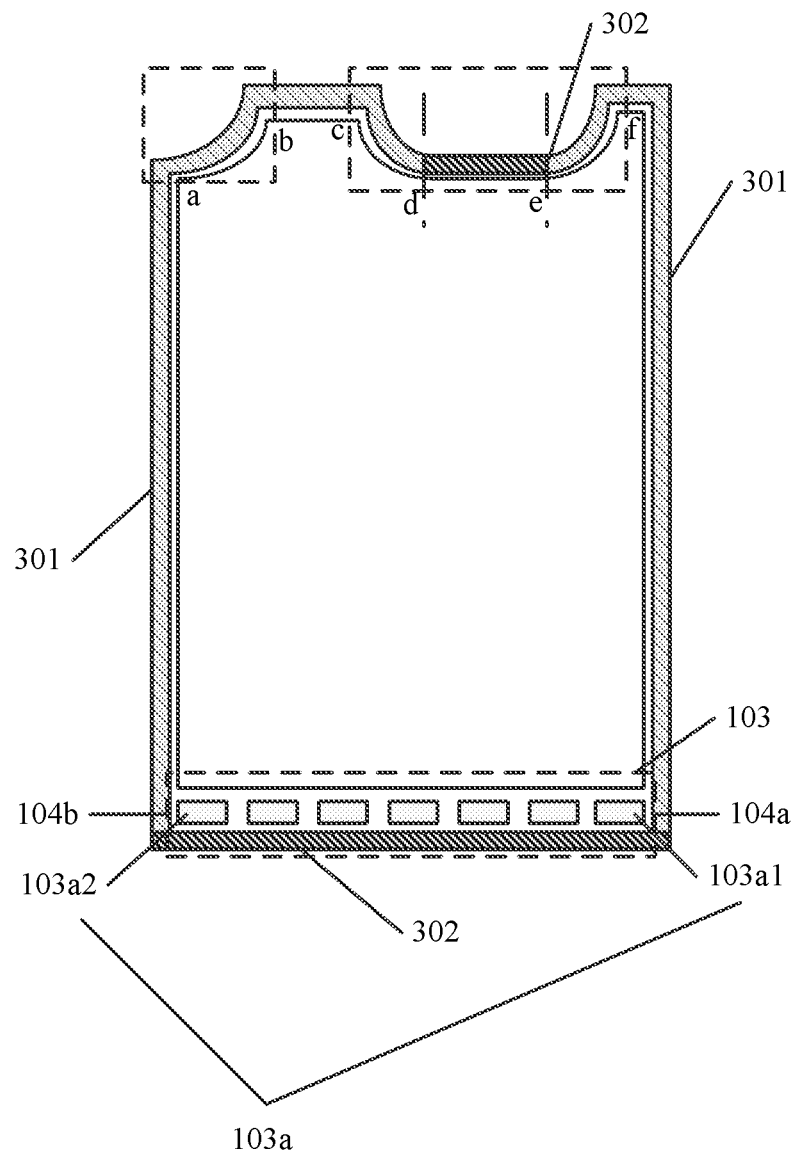

FIG. 7*c* is also a schematic structural diagram of the plastic frame in the backlight module in FIG. 6, which shows another design for the first portion and the second portion of the plastic frame. As shown in FIG. 7*c*, in this implementation, the plastic frame includes two light non-conduction portions. i.e., the plastic frame under the light source 103 and the plastic frame of the segment de, which serve as the second portion 302 of the plastic frame. The remaining plastic frame serves as the first portion 301 of the plastic frame. The first portion 301 of the plastic frame is made of a light transparent material, and is provided with a reflection layer on the outer surface. In this implementation, the first light source 103*a* includes two compensation light sources, i.e., a first compensation light source 103*a*1 and a second compensation light source 103*a*2. A first light incident section 104*a* is provided on the plastic frame inner wall corresponding to the first compensation light source 103*a*1, and a second light incident section 104*b* is provided on the plastic frame inner wall corresponding to the second compensation light source 103*a*2.

The design principle of the plastic frame is that the plastic frame used as the light conduction portion forms at least one optical path to conduct the light emitted by the compensation light source to the light emitting section.

The plastic frame can be flexibly designed in segments, to meet the requirements on different materials in different regions of the plastic frame, which is highly applicable to industrial production.

Figure 8:
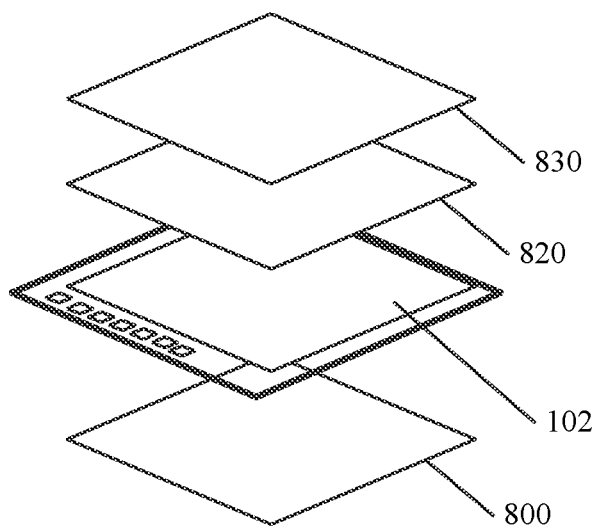
FIG. 8 is a schematic structural diagram of a backlight module according to an embodiment of the present disclosure.

FIG. 8 is a schematic structural diagram of a backlight module provided in the present disclosure. The backlight module provided in the present disclosure further includes some optical sheets. As shown in FIG. 8, in assembly, a reflection sheet 800, the light guide plate 102, a diffusion sheet 820, and a prism sheet 830 are stacked from bottom to top.

A display assembly may be formed by mounting a display panel and a driving control module on the backlight module. The display panel may be a liquid crystal display (LCD) panel or other display panels that require backlight.

Figure 9:
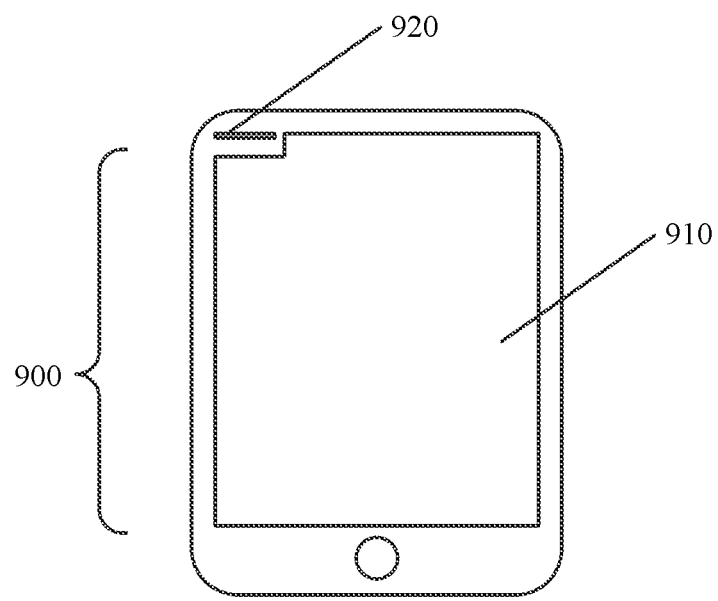
FIG. 9 is a schematic diagram of a display device including a backlight module provided in the present disclosure.

FIG. 9 is a schematic diagram of a display device including the backlight module provided in the present disclosure. As shown in FIG. 9, a display device 900 includes a display assembly having the backlight module 910 provided in the present disclosure, and an auxiliary apparatus 920 is installed in a notch region of the irregular backlight module 910.

In the display device including the backlight module provided in the present disclosure, since it is not required to additionally provide an auxiliary light source for the notch and a control circuit for the auxiliary light source, the notch of the display device including the backlight module provided in the present disclosure can be made smaller than that in the conventional technology, under the condition of the same size of the auxiliary apparatus. Therefore, the size of the notch region is reduced, and the display area is increased. In addition, an original backlight source is reused, which saves energy and cost, and simplifies the structure.

The backlight module according to the embodiments of the present disclosure is described in detail above. The principle and the embodiments of the present disclosure are described with examples. The above description of the embodiments is only intended to help understanding of the core idea of the present disclosure. Those skilled in the art may make changes on the specific embodiments and the application scope of the present disclosure according to the idea of the present disclosure. The contents in this specification should not be construed as limiting.

What is claimed is:

1. A backlight module, comprising:
a light guide plate;
a light source; and
a plastic frame;
wherein a surface of the light guide plate close to the light source is a bottom surface of the light guide plate, a surface of the light guide plate opposite to the bottom surface is a top surface of the light guide plate, a light emitting surface of the light guide plate is a front surface of the light guide plate, and a surface of the light guide plate opposite to the front surface is a back surface of the light guide plate, and surfaces of the light guide plate connected to the front surface, the back surface and the bottom surface are a first side surface and a second side surface, a first notch is formed on the first side surface, the second side surface or the top surface, and the first notch penetrates from the front surface to the back surface;
wherein the plastic frame surrounds and covers the light source, the first side surface, the second side surface and the top surface to form an accommodating space for accommodating the light guide plate and the light source, a side of the plastic frame covering the light guide plate and the light source is an inner wall of the plastic frame, and a plastic frame light incident section and a plastic frame light emitting section are provided on the inner wall of the plastic frame, the plastic frame light incident section is located at a position of the plastic frame covering the light source, and the plastic frame light emitting section is located at a position of the plastic frame covering the first notch of the light guide plate, a surface of the plastic frame light emitting section is nonparallel to the bottom surface;
wherein the plastic frame comprises a first portion and a second portion, and a part of the plastic frame from the plastic frame light incident section to the plastic frame light emitting section in one direction is the first portion of the plastic frame, light emitted by the light source is conducted from the plastic frame light incident section to the plastic frame light emitting section via the first portion; and
wherein the first portion of the plastic frame is made of a light transparent material, wherein a reflection layer is coated on an outer surface of the first portion of the plastic frame, and the plastic frame light incident section and the plastic frame light emitting section are light transparent.

2. The backlight module according to claim 1, wherein the plastic frame light incident section is located facing the light source on the inner wall of the plastic frame.

3. The backlight module according to claim 2, wherein the light source comprise a first light source and a second light source, the first light source is close to the plastic frame light incident section, and the first light source is controlled independently from the second light source.

4. The backlight module according to claim 3, wherein the first light source and the second light source are light-emitting diodes (LED).

5. The backlight module according to claim 3, wherein a light shielding portion is provided at the frame light incidence section to guide light from the first light source into the first portion of the plastic frame, and a reflection layer is coated on the light shielding portion.

6. The backlight module according to claim 1, wherein the first notch is formed at a top corner of the light guide plate intersecting the front surface.

7. The backlight module according to claim 6, wherein the first notch of the light guide plate has a rectangular shape.

8. The backlight module according to claim 1, wherein the light guide plate further comprises a second notch, and a second frame light emitting section corresponding to the second notch is provided on an inner wall of the plastic frame.

9. The backlight module according to claim 1, wherein the second portion of the plastic frame is the other part of the plastic frame than the first portion, the second portion is made of the light transparent material, and a reflection layer is coated on an outer surface of the second portion.

10. The backlight module according to claim 1, wherein the second portion of the plastic frame is the other part of the plastic frame than the first portion, the second portion is made of a light non-transparent material.

11. The backlight module according to claim 1, wherein the light transparent material passes light from the light source.

12. The backlight module according to claim 1, wherein the backlight module further comprises optical sheets, wherein the optical sheets comprise a reflection sheet, a diffusion sheet and a prism sheet, and wherein the optical sheets and the light guide plate are stacked from bottom to top in the following order: the reflection sheet, the light guide plate, the diffusion sheet, and the prism sheet.

13. The display device according to claim 12, wherein the light guide plate further comprises a second notch, and a second frame light emitting section corresponding to the second notch is provided on an inner wall of the plastic frame.

14. The display device according to claim 12, wherein the second portion of the plastic frame is the other part of the plastic frame than the first portion, the second portion is made of the light transparent material, and a reflection layer is coated on an outer surface of the second portion; or
the second portion is made of a light non-transparent material.

15. A display device, comprising:
a backlight module, and
a display panel located above the backlight module;
wherein the backlight module comprises a light guide plate, a light source and a plastic frame;
wherein a surface of the light guide plate close to the light source is a bottom surface of the light guide plate, a surface of the light guide plate opposite to the bottom surface is a top surface of the light guide plate, a light emitting surface of the light guide plate is a front surface of the light guide plate, and a surface of the light guide plate opposite to the front surface is a back surface of the light guide plate, and surfaces of the light guide plate connected to the front surface, the back surface and the bottom surface are a first side surface and a second side surface, at least one notch is formed on the first side surface, the second side surface or the top surface, and the notch penetrates from the front surface to the back surface;
wherein the plastic frame surrounds and covers the light source, the first side surface, the second side surface and the top surface to form an accommodating space for exactly accommodating the light guide plate and the light source, a side of the plastic frame covering the light guide plate and the light source is an inner wall of the plastic frame, and a plastic frame light incident section and a plastic frame light emitting section are provided on the inner wall of the plastic frame, the plastic frame light incident section is located at a position of the plastic frame coving the light source, and the plastic frame light emitting section is located at a position of the plastic frame covering the notch of the light guide plate, a surface of the plastic frame light emitting section is nonparallel to the bottom surface;

wherein the plastic frame comprises a first portion and a second portion, and a part of the plastic frame from the plastic frame light incident section to the plastic frame light emitting section in one direction is the first portion of the plastic frame, light emitted by the light source is conducted from the plastic frame light incident section to the plastic frame light emitting section via the first portion; and wherein the first portion of the plastic frame is made of a light transparent material, a reflection layer is provided on an outer surface of the first portion of the plastic frame, and the plastic frame light incident section and the plastic frame light emitting section are light-transparent.

16. The display device according to claim 15, the plastic frame light incident section is located facing the light source on the inner wall of the plastic frame.

17. The display device according to claim 16, wherein the light source comprise a first light source and a second light source, the first light source is close to the plastic frame light incident section, and the first light source is controlled independently from the second light source.

18. The display device according to claim 17, wherein a light shielding structure is provided at the frame light incidence section to guide light from the first light source into the first portion of the plastic frame, and a reflection layer is coated on the light shielding portion.

19. The display device according to claim 15, wherein the first notch is formed at a top corner of the light guide plate intersecting the front surface.

20. The display device according to claim 19, wherein the first notch of the light guide plate has a rectangular shape.

* * * * *